Figure 1:
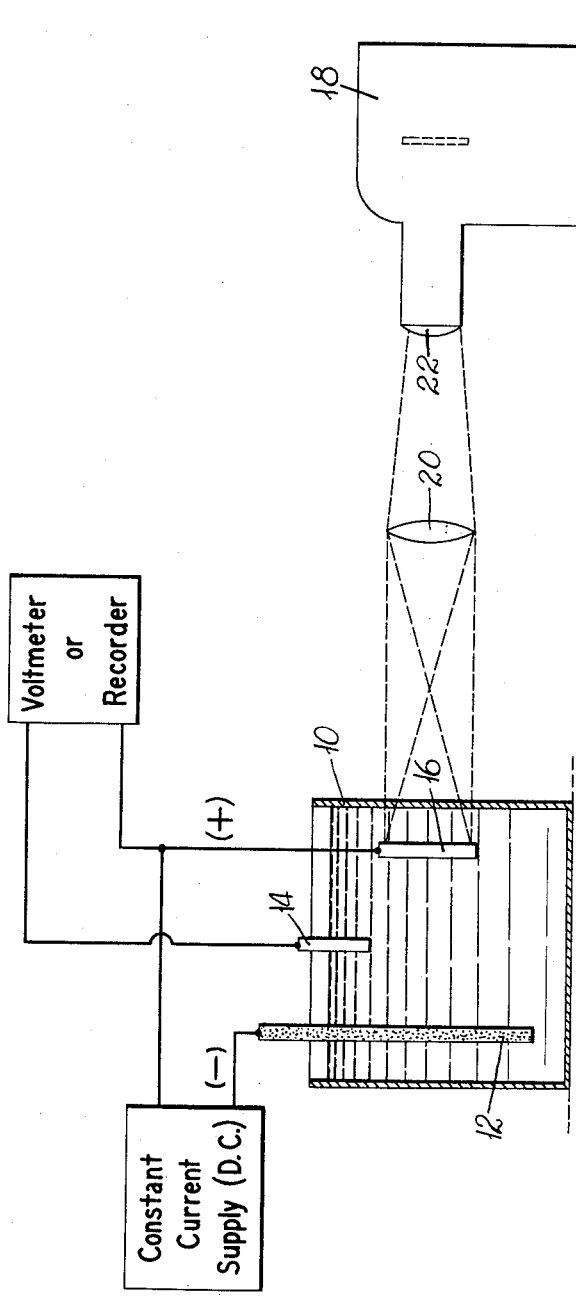

Sept. 18, 1962 J. D. VENABLES 3,054,731
METHOD OF RECORDING AN IMAGE
Filed March 30, 1959 2 Sheets-Sheet 1

INVENTOR.
JOHN D. VENABLES
BY John F. Heilmann
ATTORNEY

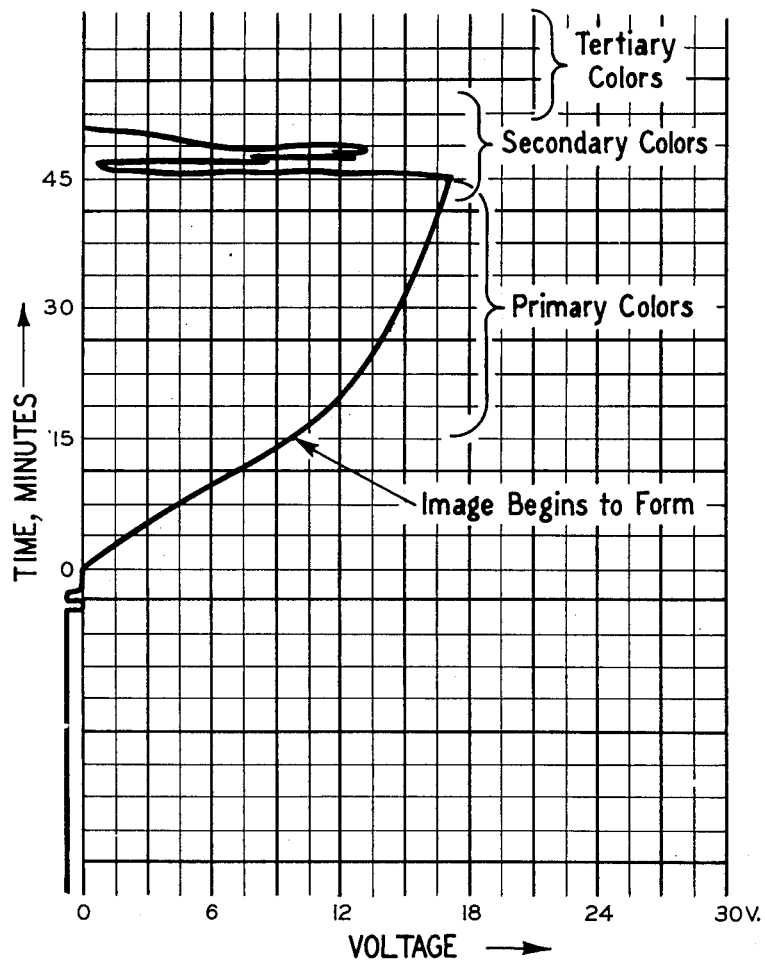

United States Patent Office 3,054,731
Patented Sept. 18, 1962

3,054,731
METHOD OF RECORDING AN IMAGE
John D. Venables, Parma Heights, Ohio, assignor to Union Carbide Corporation, a corporation of New York
Filed Mar. 30, 1959, Ser. No. 802,748
6 Claims. (Cl. 204—15)

This invention has reference to a method of recording clear, grainless images by means of an electrochemical process involving the anodization of indium antimonide surfaces.

Already known to the art to which this invention appertains is a camera device called an evaporograph. This device employs infrared radiation from objects to form an image on a thin oil film. The oil then is evaporated from various points at rates varying with the amount of radiation received producing differences in oil film thickness. When observed in reflected light, these differences in oil film thickness appear as different colors. While this device is useful for certain applications, particularly under conditions of total darkness, it has the drawback of providing image formation only on a transient, liquid film.

The present invention has for an object a method of permanently recording images with relatively short exposure times to visible light without requiring the use of silver compounds.

Another object of the invention is to provide a method of permanently recording images which is capable of producing a wide range of enlargements from a single print.

In the drawings:

FIG. 1 is a schematic representation of a device employed in the method of the invention; and FIG. 2 is a graph showing the relationship of voltage and time on image formation with the device of FIG. 1.

The device illustrated comprises a transparent vessel 10, suitably of clear plastic or of glass, containing a dilute alkaline solution such as 0.1 N potassium hydroxide solution. Immersed in the solution are a graphite cathode 12, a reference electrode 14 suitably composed of indium antimonide and a smooth surfaced anode plate of indium antimonide 16. A direct constant current source is connected to elements 12 and 16. The voltage drop across the anodic film forming on anode 16 may be observed on a voltmeter connected also to reference electrode 14. This arrangement provides means for monitoring the degree of development of the image.

With reference to FIG. 2, the voltage drop across the film initially increases at a steady rate with increasing time until such time as the slope of the curve begins to decrease markedly. At this point the image begins to form and shortly is seen as a vivid contrast in the primary interference colors. The variations in the intensity of light of the projected image reaching the InSb surface produce variations in the thickness of the transparent oxide film and, therefore, variations in the observed interference colors. If the film thickness builds up to integral multiples (2, 3 or more) of the thickness necessary for the observation of primary colors, higher order interference colors are seen. Generally, the higher order interference colors are less vivid than the primary colors, so film formation is desirably stopped after primary color formation. This occurs shortly after the slope of the voltage-time curve decreases as shown in FIG. 2.

Associated with the previously described set-up is an optical system for projecting an image on the InSb anode 16. Suitably, such a system can consist of a 35 mm. slide projector 18, using an ordinary tungsten filament lamp, together with an auxiliary lens 20 for obtaining the desired focus, this lens being positioned intermediate the objective lens 22 of the projector and anode 16. Lens 20 must focus the image sharply on the indium antimonide on anode 16.

Preferably, the InSb anode surface should be given a series of mechanical polishing treatments beginning with fine emery papers and continuing down to No. 3 alumina on a microcloth wheel followed by degreasing in trichloroethylene and ethyl alcohol. This surface pretreatment is essential for obtaining the substantially plane, scratch-free surface required for the production of a clear image. Fine scratches of the order of 0.1 micron such as those produced by No. 3 alumina appear tolerable; however, scratches much larger than that value result in localized formation of the anodic film and failure to obtain an image.

In an example of the practice of the invention, and following the necessary surface preparations as above indicated, an InSb face consisting of a zone refined, semi-conductor grade of indium antimonide which was approximately 2.3 cm.$^2$ in area, was immersed in an alkaline anodizing solution at 20° C. and the anodization was begun simultaneously with the projection of the image. The opposite surface of the flat InSb crystal which was not to be anodized was masked with a film of polystyrene from a toluene solution. This procedure is not necessary, but is desirable if one does not wish to polish the other face. Next, the D.C. current supply to the InSb electrodes was maintained at 200 micro amperes per square centimeter. Within two to five minutes from the time the current was turned on, the anodic film had formed, and a brightly colored image was permanently recorded on it, as indicated by visual observation of the surface and by the voltage behavior.

In the above example, the voltage-time graph of the voltage drop increased steadily with film formation, reached a "turnover point" at about 12 volts, and increased slowly from there on until the finished image was observed to have been formed. The cut-off voltage in this instance was about 17 volts. The time-to-completion of the image was about 4.5 minutes.

If desired, the anodic film containing the recorded image may be dissolved in concentrated hydrofluoric acid. The InSb surface is not attacked by HF, and thus it may be reanodized without further treatment.

Aside from the obvious variations in the size of the InSb sample and in the general mechanical arrangement, there exists many possible modifications of the present invention. Conditions such as current, voltage, time and temperature of the anodizing solution may be varied. Current, time and voltage are interrelated in that a higher current density results in a faster rate of film formation (thus a faster voltage rise) and a shorter time needed to complete the image. These factors in turn depend upon the nature of the InSb material employed. The anodization rate will vary with the crystal face of the InSb which is exposed, and possibly also with the purity of the InSb. In the example given, only the (111) crystal face was employed to record the image. The use of single crystal material made possible the production of a grainless image. Polycrystalline InSb may be utilized; however, some grain may then be apparent in the image.

Among other suitable image projecting means is the projecting microscope. With this device it is possible to employ the method of the invention for producing and recording an image in the first instance, without photographing the object.

Studies have shown the indium antimonide anodic film to be insensitive to light having a wavelength greater than 5200 A.

Other anodizing solutions including sodium hydroxide, sodium carbonate and lithium hydroxide and concentrations other than that disclosed here, can be employed.

Similarly, other methods of surface preparation of the InSb face (e.g., ultrasonic cleaning techniques) may be suitable. Chemical polishing treatments, however, have not been found to be satisfactory for obtaining a smooth, non-contaminated surface.

What is claimed is:

1. A method of recording an image comprising providing an anode having an indium antimonide surface thereon and a cathode in an electrolyte, and anodically depositing an oxide layer on said surface while projecting said image on said surface during the anodization thereof.

2. The method of claim 1 wherein said electrolyte is an alkaline solution.

3. The method of claim 2 wherein said alkaline solution is selected from the group consisting of potassium hydroxide, sodium hydroxide, sodium carbonate and lithium hydroxide.

4. The method of claim 1 wherein said anode is a smooth-surfaced plate of indium antimonide.

5. The method of claim 4 wherein said indium antimonide is of the single crystalline variety.

6. The method of claim 1 wherein said image is projected through a lens and focused sharply on said surface.

References Cited in the file of this patent

UNITED STATES PATENTS

| 2,720,488 | Dwyer | Oct. 11, 1955 |
| 2,929,859 | Loferski | Mar. 22, 1960 |

OTHER REFERENCES

Television, vol. 1, No. 1, p. 20, June 1928.

Bell System Tech. Journ., vol. 35, March 1956, pp. 333–347, 204–232.

Smith: Semiconductors, University Press, Cambridge, pp. 214–215, 392–398.